United States Patent
Peachey et al.

(10) Patent No.: US 9,815,404 B2
(45) Date of Patent: *Nov. 14, 2017

(54) SYSTEM FOR SIMULATED MULTI-GEAR VEHICLE SOUND GENERATION

(71) Applicants: Harman International Industries, Incorporated, Northridge, CA (US); Harman Becker Automotive Systems Manufacturing KFT, Szekesfehervar (HU)

(72) Inventors: Colin Peachey, Norwich (GB); Carl Glen Dryhurst, Norwich (GB); Stephen James Smith, Norwich (GB); Jonathan R Lane, Whitmore Lake, MI (US)

(73) Assignees: Harman Becker Automotive Systems Manufacturing KFT (HU); Harman International Industries, Incorporated, Northridge, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 14/102,055

(22) Filed: Dec. 10, 2013

(65) Prior Publication Data

US 2014/0177866 A1    Jun. 26, 2014

Related U.S. Application Data

(63) Continuation of application No. 13/336,846, filed on Dec. 23, 2011, which is a continuation of application
(Continued)

(51) Int. Cl.
*H04B 1/00* (2006.01)
*H03G 3/00* (2006.01)
(Continued)

(52) U.S. Cl.
CPC ............... *B60Q 5/00* (2013.01); *G10K 15/02* (2013.01); *G10K 15/04* (2013.01)

(58) Field of Classification Search
CPC .................................................. H04R 2499/01
(Continued)

(56) References Cited

U.S. PATENT DOCUMENTS 3,425,156 A    2/1969    Field
4,160,339 A    7/1979    Dankman et al.
(Continued)

FOREIGN PATENT DOCUMENTS

EP    2202111 A2    6/2010
JP    S59151655 A    8/1984
(Continued)

OTHER PUBLICATIONS

International Search Report and Written Opinion dated Feb. 21, 2011, from PCT Application No. PCT/US2010/053761, 15 pages.
(Continued)

*Primary Examiner* — Alexander Jamal
(74) *Attorney, Agent, or Firm* — Brooks Kushman P.C.

(57) ABSTRACT

A vehicle sound generator system is configured to generate a signal configured to drive one or more speakers produce sound waves simulating sounds associated with a desired engine type. The signal is based on one or more operating conditions of a vehicle. The vehicle sound generator system is configured to select sounds from a plurality of sounds based on the operating conditions of the vehicle. Each sound corresponds to a simulated sound of an engine operating in a respective gear. The vehicle sound generator system may generate the signal to drive the speakers to produce selected sounds to simulate shifting between the respective gears.

20 Claims, 8 Drawing Sheets

Related U.S. Application Data

No. PCT/US2010/053761, filed on Oct. 22, 2010, now Pat. No. 8,620,001.

(60) Provisional application No. 61/254,564, filed on Oct. 23, 2009.

(51) Int. Cl.
*B60Q 5/00* (2006.01)
*G10K 15/04* (2006.01)
*G10K 15/02* (2006.01)

(58) Field of Classification Search
USPC .......................................................... 381/86
See application file for complete search history.

(56) References Cited

U.S. PATENT DOCUMENTS

| | | | |
|---|---|---|---|
| 4,186,519 A | 2/1980 | Repka | |
| 4,219,962 A | 9/1980 | Dankman et al. | |
| 4,266,368 A | 5/1981 | Nyman | |
| 4,291,877 A | 9/1981 | Ensmann et al. | |
| 4,325,199 A | 4/1982 | McEdwards | |
| 4,613,103 A | 9/1986 | Waranowitz | |
| 4,642,538 A * | 2/1987 | Elliott | B60L 1/00 318/139 |
| 4,946,416 A | 8/1990 | Stern et al. | |
| 4,997,404 A | 3/1991 | May | |
| 5,045,016 A | 9/1991 | Stern et al. | |
| 5,314,372 A | 5/1994 | Kramer | |
| 5,371,802 A * | 12/1994 | McDonald | G10K 15/02 381/110 |
| 6,457,681 B1 | 10/2002 | Wolf et al. | |
| 6,604,641 B2 | 8/2003 | Wolf et al. | |
| 6,619,594 B2 | 9/2003 | Wolf et al. | |
| 6,655,640 B2 | 12/2003 | Wolf et al. | |
| 7,210,656 B2 | 5/2007 | Wolf et al | |
| 7,298,103 B2 | 11/2007 | Denen et al. | |
| 7,307,394 B1 | 12/2007 | Denen et al. | |
| 7,656,110 B2 | 2/2010 | Denen et al. | |
| RE42,284 E | 4/2011 | Severson et al. | |
| 8,121,764 B2 | 2/2012 | Yamada | |
| 8,179,234 B1 * | 5/2012 | Atwood | B60Q 5/008 340/384.1 |
| 2002/0193894 A1 | 12/2002 | Terada et al. | |
| 2004/0170288 A1 | 9/2004 | Maeda | |
| 2005/0113168 A1 | 5/2005 | Maeda | |
| 2006/0074645 A1* | 4/2006 | Tischer | G10K 15/02 704/226 |
| 2007/0182525 A1* | 8/2007 | McCarthy | H04S 7/00 340/425.5 |
| 2008/0317257 A1 | 12/2008 | Furge et al. | |
| 2009/0028353 A1* | 1/2009 | Kobayashi | A63G 31/16 381/61 |
| 2011/0010269 A1 | 1/2011 | Ballard | |

FOREIGN PATENT DOCUMENTS

| | | |
|---|---|---|
| JP | 04-140567 | 5/1992 |
| JP | H05080790 A | 4/1993 |
| JP | 08-115481 | 5/1996 |
| JP | 10-083187 | 3/1998 |
| JP | H11288291 A | 10/1999 |
| JP | 2000001142 A5 | 1/2000 |
| JP | 2000329226 A | 11/2000 |
| JP | 2002201973 A | 7/2002 |
| JP | 2004180800 A | 7/2004 |
| JP | 2004344279 A | 12/2004 |
| JP | 2005128262 A2 | 5/2005 |
| JP | 2007264332 A | 10/2007 |
| JP | 2008003267 A7 | 1/2008 |
| JP | 2008176169 A | 7/2008 |
| JP | 2008207622 A | 9/2008 |
| WO | 2008090337 A2 | 7/2008 |

OTHER PUBLICATIONS

International Preliminary Report on Patentability and Written Opinion, dated May 3, 2012, pp. 1-11, International Application No. PCT/US2010/053761, International Bureau of WIPO, Switzerland.
Japanese Office Action dated Nov. 10, 2014 for Japanese Patent Application No. 2012-535417.

* cited by examiner

| Simulated Upshift | Conditions |
|---|---|
| $G_1 \rightarrow G_2$ | $R > R_1$ and $T < T_{max}$ or $R > R_4$ and $T \geq T_{max}$ |
| $G_2 \rightarrow G_3$ | $R > R_3$ and $T < T_{max}$ or $R > R_{10}$ and $T \geq T_{max}$ |
| $G_3 \rightarrow G_4$ | $R > R_6$ and $T < T_{max}$ or $R > R_{12}$ and $T \geq T_{max}$ |
| $G_4 \rightarrow G_5$ | $R > R_7$ and $T < T_{max}$ or $R > R_{14}$ and $T \geq T_{max}$ |
| $G_5 \rightarrow G_6$ | $R > R_9$ and $T < T_{max}$ or $R > R_{15}$ and $T \geq T_{max}$ |

400

R = Road Speed
T = Throttle Position

FIG. 4

| Simulated Downshift | | Condition |
|---|---|---|
| $G_2$ | $G_2 \rightarrow G_1$ | $R < R_2$ and $T_{min} < T < T_{max}$ or $R = 0$ |
| $G_3$ | $G_3 \rightarrow G_2$ | $R_2 \leq R < R_5$ and $T_{min} < T < T_{max}$ |
| | $G_3 \rightarrow G_1$ | $R < R_2$ and $T_{min} < T < T_{max}$ or $R = 0$ |
| $G_4$ | $G_4 \rightarrow G_3$ | $R_5 \leq R < R_8$ and $T_{min} < T < T_{max}$ |
| | $G_4 \rightarrow G_2$ | $R_2 \leq R < R_5$ and $T_{min} < T < T_{max}$ |
| | $G_4 \rightarrow G_1$ | $R < R_2$ and $T_{min} < T < T_{max}$ or $R = 0$ |
| $G_5$ | $G_5 \rightarrow G_4$ | $R_8 \leq R < R_{11}$ and $T_{min} < T < T_{max}$ |
| | $G_5 \rightarrow G_3$ | $R_5 \leq R < R_8$ and $T_{min} < T < T_{max}$ |
| | $G_5 \rightarrow G_2$ | $R_2 \leq R < R_5$ and $T_{min} < T < T_{max}$ |
| | $G_5 \rightarrow G_1$ | $R < R_2$ and $T_{min} < T < T_{max}$ or $R = 0$ |
| $G_6$ | $G_6 \rightarrow G_5$ | $R_{11} \leq R < R_{13}$ and $T_{min} < T < T_{max}$ |
| | $G_6 \rightarrow G_4$ | $R_8 \leq R < R_{11}$ and $T_{min} < T < T_{max}$ |
| | $G_6 \rightarrow G_3$ | $R_5 \leq R < R_8$ and $T_{min} < T < T_{max}$ |
| | $G_6 \rightarrow G_2$ | $R_2 \leq R < R_5$ and $T_{min} < T < T_{max}$ |
| | $G_6 \rightarrow G_1$ | $R < R_2$ and $T_{min} < T < T_{max}$ or $R = 0$ |

SYSTEM FOR SIMULATED MULTI-GEAR VEHICLE SOUND GENERATION

PRIORITY CLAIM

This application is a continuation of U.S. Non-Provisional application Ser. No. 13/336,846, filed Dec. 23, 2011, which is a continuation of PCT/US2010/053761, filed Oct. 22, 2010, which claims the benefit of the filing date under 35 U.S.C. §119(e) of U.S. Provisional Patent Application No. 61/254,564, filed Oct. 23, 2009, all of which are incorporated herein by reference.

BACKGROUND OF THE INVENTION

Technical Field

The present disclosure relates generally to generating simulated vehicle sounds and, more particularly to, generating simulated sounds associated with operation of a multi-gear vehicle based on actual vehicle operating conditions.

Related Art

Electric and hybrid vehicles are becoming increasingly popular due to environmental concerns and costs associated with fossil fuels and other combustion fuels. However, electric vehicles typically may not have desired characteristics found in combustion-engine vehicles. Among those characteristics are the sounds associated with an engine accelerating and shifting gears, either automatically or through manual control. Therefore, a need exists to provide simulated vehicle sound generation to provide a simulated audio experience of a desired vehicle type while operating another type of vehicle.

SUMMARY

A vehicle sound generator system may generate one or more signals configured to drive speakers in a vehicle to produce simulated engine sounds. The vehicle sound generator system may generate signals based on operating conditions of the vehicle. In one example, the signals generated by the vehicle sound generator may drive the speakers to produce simulated sounds of an engine operating in a respective gear.

The vehicle sound generator system may detect a change in the operating conditions of the vehicle and select a different sound based on the detected change. In one example, the vehicle sound generator may select a sound based on changes in vehicle speed, vehicle throttle position, or both. The vehicle sound generator system may detect operating condition changes based on one or more tables having predetermined operating thresholds for the vehicle. The vehicle sound generator system may generate particular sounds corresponding to a particular gear of a desired engine when the operating conditions of the vehicle reach the predetermined operating thresholds corresponding to the particular gear.

The vehicle sound generator system may be stored as one or more software modules on a computer-readable medium or may be a combination of hardware and software modules. The vehicle sound generator system may be executable by one or more processors. The vehicle sound generator system may select sounds from a sound library. The vehicle sound generator system may be configured to generate signals to drive speakers oriented to produce sound waves into a cabin of the vehicle, outwardly from the vehicle, or both.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
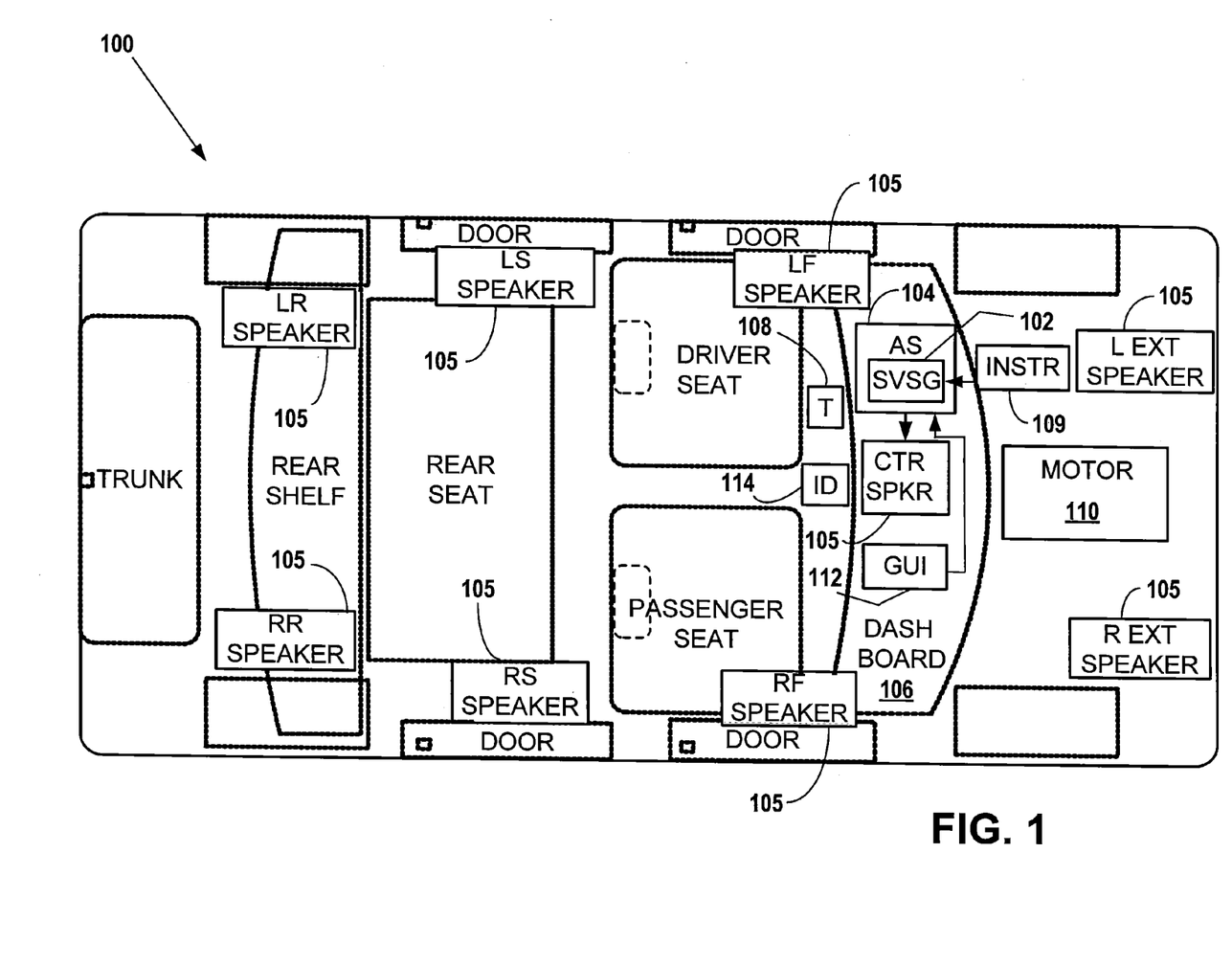
FIG. 1 depicts a diagram of an example electric vehicle including a simulated vehicle sound generator system.

In FIG. 1, a vehicle 100 is shown as including a simulated vehicle sound generator (SVSG) system 102. The vehicle 100 may include an audio system (AS) 104, shown in FIG. 1 as being located in a dashboard 106 of the vehicle 100. The audio system 104 may include various components associated with a vehicle audio system such as AM/FM radio, CD player, cassette deck, personal music player input connector, equalizer, amplifier, cellular telephone interface, navigation system, and any other components suitable for a vehicle audio system. The audio system 104 may be two channel stereo or multi-channel, such as a five, six, or seven channel surround system. The audio system 104 may include software modules, hardware modules, or a combination thereof used to process audio signals provided to a plurality of speakers 105 throughout the vehicle 100. The audio system 104 may include a processor and a memory capable of supporting the SVSG system 102, such as that described later with regard to FIG. 2.

In one example, the vehicle 100 may be a fully or partially-electric vehicle. The vehicle 100 may be driven by an electric motor 110. In other examples, the vehicle 100 may include an internal combustion engine. The motor 110 of the vehicle 100 may generate sounds different than those that may be heard by vehicle occupants in other vehicles types, such as a vehicle having an internal combustion engine. Occupants of an electric vehicle may desire to experience sounds associated with an internal combustion engine or other sound effect. The SVSG system 102 may be configured to simulate sounds associated with a vehicle being driven by a combustion engine, such as a jet, motorboat, rocket, or other vehicle type. The SVSG system 102 may also be configured to simulate other sounds as well. In one example, the SVSG system 102 may generate simulated engine sounds based on the operating condition of the vehicle 100, such as road speed and throttle position. For example, the SVSG system 102 may be configured to generate simulated sounds associated with a vehicle having a multi-gear internal combustion engine. In one example, the vehicle 100 may include an internal combustion engine. The SVSG system 102 may be configured to generate simulated sounds to match the sounds of the internal combustion engine allowing the sound of the internal combustion engine experienced by a listener to be enhanced by the simulated sounds.

The sounds may be produced through speakers 105 present in the vehicle 105. The speakers 105 may include a center (CTR) speaker, right front (RF) and left front (LF) speakers, right side (RS) and left side (LS) speakers, and right rear (RR) and left rear (LR) speakers as shown in FIG. 1. In one example, the vehicle 100 may also include a right external (R EXT) and a left external (L EXT) speaker positioned in the motor compartment of the vehicle 100. Each of the speakers 105 may be driven to produce sound waves based on audio signals generated by the SVSG system 102. The right and left external speakers may be driven to produce simulated vehicle sounds that are audible outside/external to the vehicle 100 and to occupants inside of the vehicle 100. In one example, sounds waves emitted by the external speakers may be used to vibrate portions of a motor compartment of the vehicle 100. In other examples, electromagnetic shaker panels may be used with the SVSG system 102 to generate simulated engine sounds alone or in conjunction with the speakers 105. This may provide a more realistic vehicle sound to occupants in the vehicle 100 by producing simulated vehicle sounds associated with vehicle components vibrating associated to with operation of a desired engine type.

The SVSG system 102 may generate sounds based on various operating conditions of the vehicle 100. For example, the SVSG system 102 may receive an input signal based on a throttle (T) 108 of the vehicle 100 and road speed of the vehicle 100. "Road speed" may refer to a velocity related to a particular vehicle, including aircraft, watercraft, or any other vehicle types. "Road speed" may also refer to a velocity of wheeled vehicle regardless of whether the vehicle is travelling on road, off road, or some other non-road surface.

A position level of the throttle 108 may be provided directly to the SVSG system 102 as shown in FIG. 1 or may be indirectly obtained by the SVSG system 102 through a controlled area network (CAN) (not shown) or other suitable vehicle communication bus system. The road speed of the vehicle 100 may be determined at an instrumentation module 109 that may generate a road speed signal indicative of the road speed of the vehicle 100. The SVSG system 102 may receive the throttle level of the throttle 108 and the road speed signal. The SVSG system 102 may generate simulated engine sounds based on the throttle level and the road speed signal. In other examples, one or more other input signals may be utilized in addition to or in lieu of the throttle position and road speed, such as motor load, torque, power, vehicle light status, or cruise control operation.

The vehicle 100 may also include an input device (ID) 114. The input device 114 may include a manual gear shifter allowing a vehicle occupant to manually provide input to the SVSG system 102 indicating when a simulated upshift or downshift is desired. The input device 114 may be used in conjunction with automatic simulated multi-gear functions, allowing the SVSG system 102 to operate in a semi-automatic manner. In one example, the input device 114 may be a lever mounted in a steering column of the vehicle 100, dash board 106, or in another appropriate area within the vehicle 100. In other examples, the input device 114 may include multiple levers, or other mechanisms configured to receive manual input, disposed within the vehicle 100, such as separate dedicated upshift or downshift levers. Levers or other devices may be multi-positional allowing a particular simulated gear to have a specific position. In other examples, the levers may be of a "slap-shift" configuration allowing the levers to be biased from an initial position for simulated downshifting/upshifting and returning to the initial position for subsequent simulated shifting.

The SVSG system 102 may be implemented within the audio system 104 as shown in FIG. 1 or may be implemented as a stand-alone system separate from the audio system 104. The SVSG system 102 may produce audible sound through one more of the speakers 105, which may be shared with the audio system 104 or strictly dedicated to the SVSG system 102. Alternatively, additional speakers 105 may be added to those shown in FIG. 1 to use with the SVSG system 102. The SVSG system 102 may select a subset of available speakers 105 to generate desired simulated engine sound based on input from a current vehicle occupant or based on predetermined criteria. For example, a first driver of the vehicle 100 may desire that the left and right external and the center speakers be used to produce sounds from the SVSG system 102. A second subsequent driver of the vehicle 100 may desire that only the center speaker be used to produce sounds from the SVSG system 102 and select such a speaker configuration. In one example, the SVSG system 102 may include and/or be in communication with a user interface, such as graphical user interface (GUI) 112 on board the vehicle to allow the particular speaker selections, sound effects, etc., to be selected by an occupant of the vehicle 100. The GUI 112 may be integrated to control various aspects of the vehicle 100 such as the audio system 104, environmental controls, etc.

Figure 2:
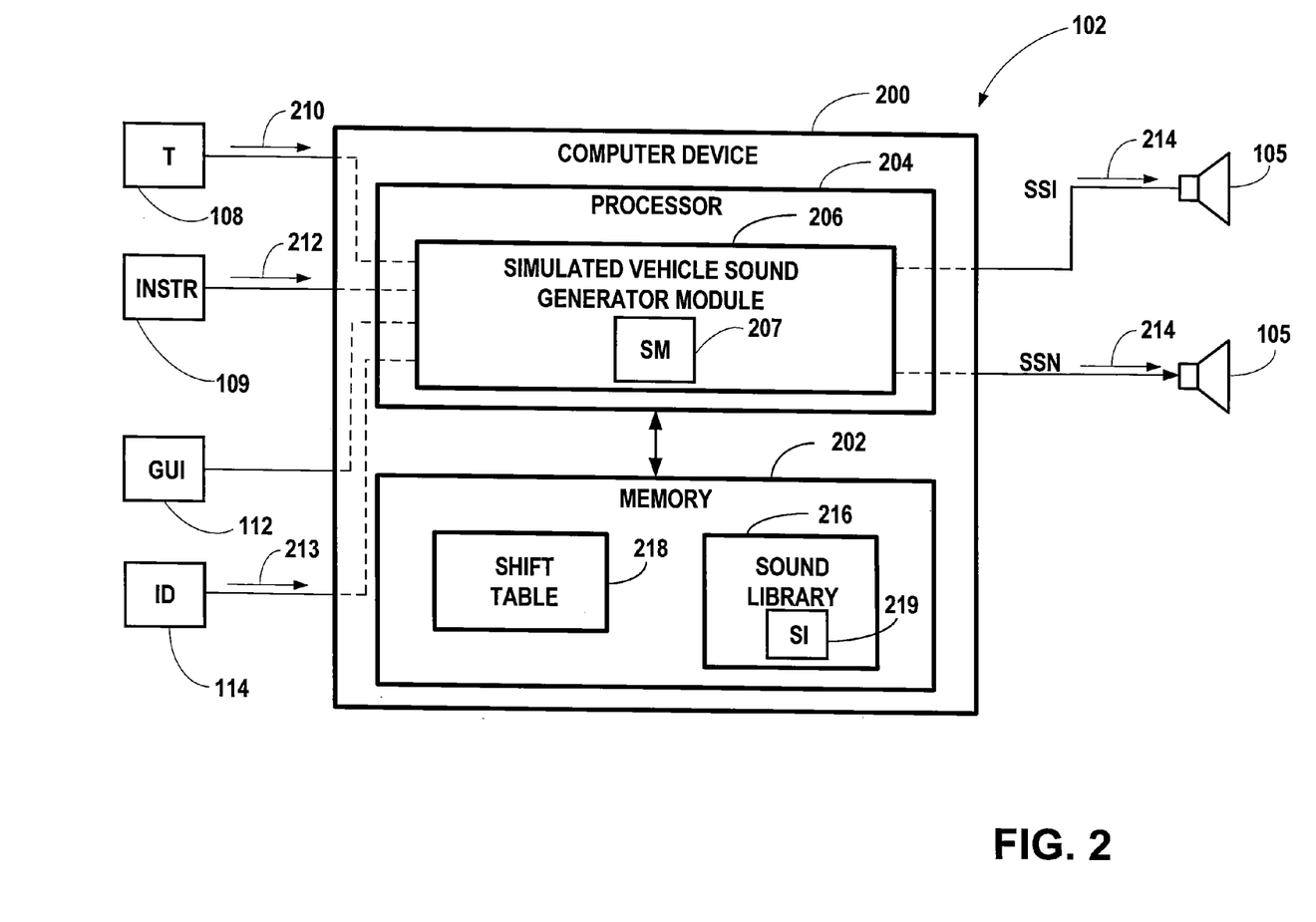
FIG. 2 depicts an example simulated vehicle sound generator system.

FIG. 2 is a block diagram of the SVSG system 102, such as that described in FIG. 1. The SVSG system 102 may include a computer device 200 having a memory 202 and a processor 204. The memory 202 may include one or more memories and may be computer-readable storage media or memories, such as a cache, buffer, RAM, removable media, hard drive or other computer readable storage media. Computer readable storage media may include various types of volatile and nonvolatile storage media. Various processing techniques may be implemented by the processor 204 such as multiprocessing, multitasking, parallel processing and the like, for example. The processor 204 may include one or more processors. The computer device 200 may be included in the audio system 104 as described with regard to FIG. 1 or may be a stand-alone device in addition to the audio system 104.

The processor 204 may execute a simulated vehicle sound generator module 206 included in the SVSG system 102. As described herein, the term "module" may be defined to include software, hardware or some combination thereof executable by the processor 204. Software may include instructions stored in the memory 202, or other memory device, that are executable by the processor 204 or other processor. Hardware may include various devices, components, circuits, gates, circuit boards, and the like that are executable, directed, and/or controlled for performance.

The computer device 200 may receive input signals from various sensors or other sources based on operating conditions of the vehicle 100. In FIG. 2, the computer device 200 may receive a throttle level signal 210 from the throttle 108 and a road speed signal 212 from the instrumentation module 109. The computer device 200 may also generate a plurality of simulated sound signal 214 that may be used to produce sounds through driving the speakers 105. Each simulated sound signal 214 is individually designated as SS1 through SSN in FIG. 2, where N is the number of speakers 105 that may receive a simulated sound signal 214.

The simulated vehicle sound generator module 206 may receive input from the GUI 112 indicating a user-selected parameter related to the particular sounds desired, such as a particular make/model of an automobile, a jet, rocket, spacecraft, etc., or a non-vehicle sound effect. A user may select the desired sound effect from a plurality of sound effects stored in a sound library data set 216 stored in the memory 202. The sound library data set 216 may be updated to add other sound effects or to update current sound effects through the GUI 112, wireless communication, wired communication, or any other manner of communicating update information to the computer device 200.

In one example, the simulated vehicle sound generator module 206 may be configured to generate simulated sounds signals to include simulated gear shifting and operation in a particular gear for a simulated engine type based on the operating conditions of the vehicle 100. The simulated gear shifting may refer to simulation associated with operation of a geared engine found in various vehicles having combustion engines, which may include upshifting, i.e., transitioning from a current gear to a higher gear, and downshifting, i.e., transitioning from a current gear to a lower gear.

Based on the throttle signal 210 and the road speed signal 212, the simulated vehicle sound generation module 206 may generate sounds associated with operating vehicle such as accelerating and decelerating in multiple simulated gears along with upshifting and downshifting into the gears. The simulated vehicle sound generator module 206 may access a shift table data set 218 stored in the memory 202. Sounds associated with simulated gear shifting may be based on the actual road speed of the vehicle 100 and the throttle position of the throttle 108. Use of the simulated gear shifting may provide an occupant of the vehicle 100 a richer experience associated with simulated engine sounds associated with a particular vehicle type.

The sound library 216 may be configured to store information regarding simulated sounds for particular engine types. The sounds may be stored as information for each engine type that may be implemented by the SVSG module 206 to generate the simulated sounds signal 214. In one example, the sounds may be stored in the sound library 216 as sound information ("SI") 219 related to sound measurements taken for particular engine types. Sound measurements for particular engine types may be taken from an actual engine of the particular type and analyzed to determine various sound characteristics, such as the dominant harmonics of a particular engine type, as well as, other sound characteristics associated with the particular engine type. These sound measurements may be processed into data represented by the sound information 219 that may be used by the SVSG module 206. In one example, the SVSG module 206 may implement a synthesizer module ("SM") 207, which allows the SVSG module 206 to generate a simulated sound signal 214 based on the sound information 219 stored in the sound library 216.

The sound library 216 may include a look-up table mapping sound information associated with sounds for each available engine type to corresponding operating conditions of the vehicle 100. For example, the sound information 219 may be stored digitally so that a particular portion of the sound information 219 corresponds to particular operating conditions of the vehicle 100. The SVSG module 206 may then receive the signals 210, 212, and/or 213 from the throttle 108, instrumentation module 109, and input device 114, respectively, and based on the signals 210, 212, and/or 213, retrieve the corresponding sound information 219 from the sound library 216 to synthesize the simulated sound signal 214. As the vehicle 100 changes in speed, the SVSG module 206 may manipulate the simulated sound signal 214 to drive the speakers 105 to produce the desired simulated engine sound. The SVSG module 206 may also implement the shift table 218 in adjusting the simulated sounds signals 214 to produce the desired sounds through the speakers 105.

The SVSG module 206 may also monitor the differential of the vehicle speed, which may serve as a proxy for the throttle position of the throttle 108 and load of the motor 110 in a fully-electric or hybrid vehicle 100. Based on the differential, the SVSG module 206 may determine the amount energy regeneration occurring in the motor 110. In one example, the motor 110 may perform regenerative braking in order to slow the vehicle 100. The SVSG module 206 may use the current generated by the motor 110 during regenerative braking to determine that the vehicle is decelerating. For example, the SVSG module 206 may retrieve sound information 219 from the sound library 216 corresponding to the level of regenerative braking current and generate the simulated sound signal 214 based on the retrieved sound information 219. The simulated sound signal 214 may drive the speakers 105 to produce sounds associated with engine braking of the particular engine type being simulated. Thus, sounds produced by the speakers 105 may also provide an audio indication of the level of regenerative braking taking place to a listener.

Figure 3:
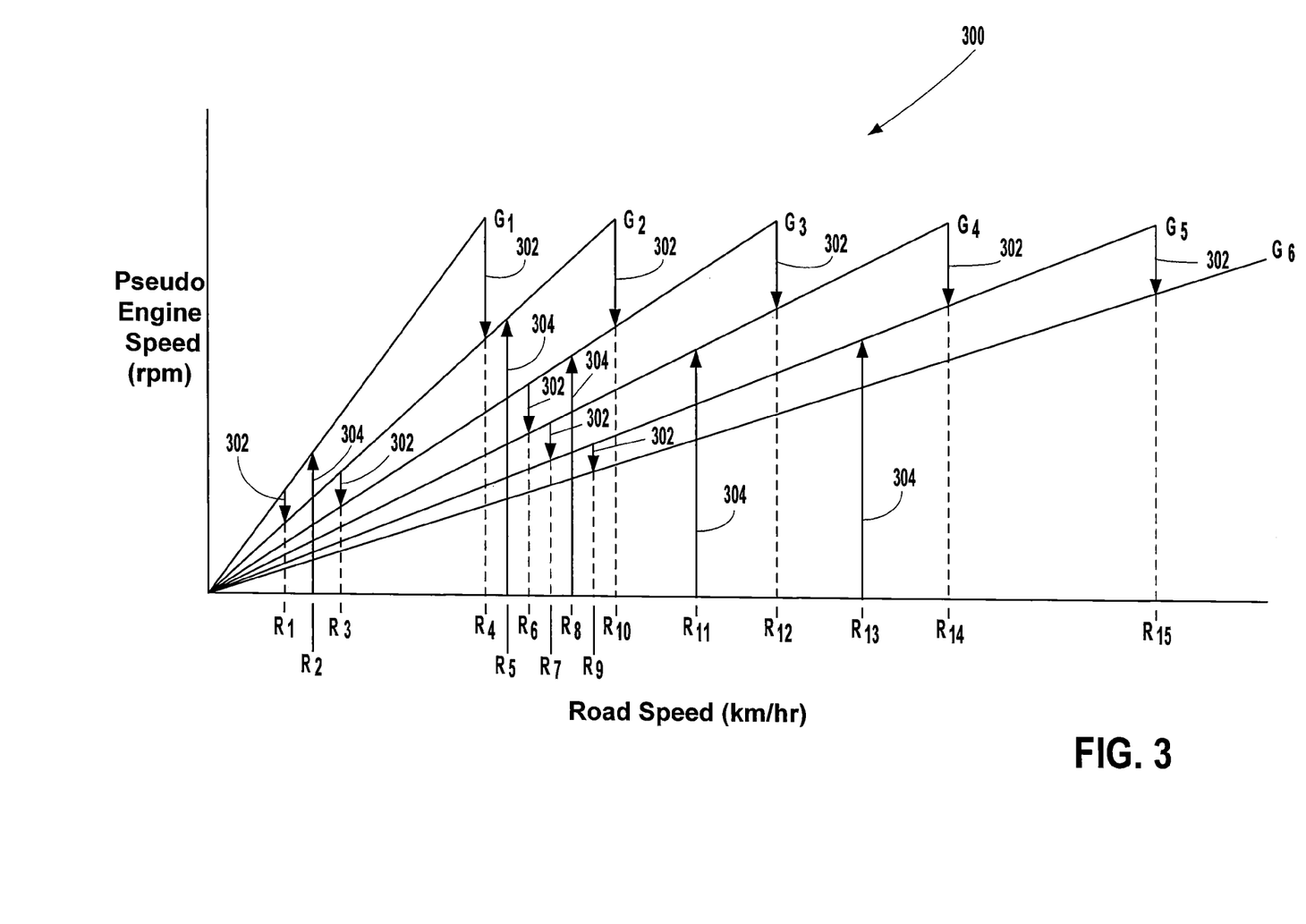
FIG. 3 depicts an example plot of pseudo engine speed versus road speed for an electric vehicle.

FIG. 3 shows an example of a plot representative of simulated upshift and downshift threshold points with respect to the road speed of the vehicle 100. The plot 300 plots the road speed (R) of the vehicle 100 versus a pseudo engine speed (rpm) of the vehicle 100. The pseudo engine speed may provide a reference number representing calculated revolutions per minute associated with a simulated engine based the actual road speed of the vehicle 100.

In FIG. 3, a pseudo engine speed versus road speed plot is generated for six different simulated gears, individually designated as G1 through G6 for FIG. 3. In other examples, any number of gears may be used. The pseudo road speed may be calculated using the equation:

$$E_n = R/G_n \qquad \text{Eqn. 1}$$

where $E_n$ is the pseudo engine speed, R is the actual road speed of the vehicle 100, and $G_n$ is the effective gear ratio. The subscript "n" represents the particular gear number. Since $G_n$ is a constant for each gear, the resultant road speed v. pseudo engine speed plot for each gear produces a straight line as shown in FIG. 3. In one example, the simulated gear ratios for six simulated gears may be as shown in Table 1:

TABLE 1

| Gear | $G_n$ |
| --- | --- |
| G1 | 1 |
| G2 | 0.6 |
| G3 | 0.44 |
| G4 | 0.35 |
| G5 | 0.3 |
| G5 | 0.25 |

The plot of FIG. 3 illustrates where various upshift and downshift threshold points that may be set with regard to the road speed of the vehicle 100. In FIG. 3, the downwardly pointing arrows 302 connecting adjacent plot lines for each gear represent a lowest speed in the particular simulated gear where a simulated upshift to the next gear, e.g. G1 to G2, may occur. The upwardly pointing arrows 304 may represent the highest road speed for the particular gear at which the arrow head terminates that a downshift may occur into that particular gear.

While the plot of FIG. 3 illustrates road speed thresholds for simulated upshifting and downshifting for various road speeds of the vehicle 100, the simulated vehicle sound generator module 206 may also rely on the throttle position of the throttle 108 to select the proper simulated gear sound to be produced through the speakers 105. In one example, various throttle position threshold points of the throttle 108 may be predetermined for use by the simulated vehicle sound generator module 206. For example, a minimum throttle position, $T_{min}$, may be selected to be about 10% or less of the full throttle position and a maximum throttle position, $T_{max}$, may be selected as about 90% or more of the full throttle position. The sounds associated with the simulated gears including sounds associated operating an engine in the particular gears, as well as upshifting and downshifting into the particular gears, may be generated based on a current road speed and the throttle position of the vehicle 100.

When synthesizing the simulated engine sounds or using recorded sounds from the sound information 219, the SVSG module 206 may implement the shift table 218 in order to accurately produce the simulated sounds as desired. The SVSG module 206 may adjust the simulated sound signal 214 using the signals 210, 212, and 213 as described with regard to FIG. 3. During adjustment, the SVSG module 206 may also implement the shift table 218 as well, allowing the SVSG module 206 to generate the desired sound for the desired simulated gear.

In some actual internal combustion engines, transitions between gears during shifting may not be substantially instantaneous due to the inertia of mechanical components involved in the gear transition. In one example, the SVSG module 206 may generate the simulated sound signal 214 to drive the speakers 105 to produce sounds associated with gear transitions of such nature. The SVSG module 206 may generate sounds associated with "overshoots" and "undershoots" depending on the current operating conditions of a vehicle. For example, an "overshoot" may refer to a situation in which a driver has engaged a clutch and is also engaging throttle causing the engine speed to rapidly increase due to the clutch being engaged by the driver. An "undershoot" may refer to the clutch being engaged with no throttle being operated causing the engine speed to rapidly drop. Based on the signals 210, 212, and 213, the SVSG module 206 may determine that such conditions are present to generate the simulated sound signal 214 to simulate sounds associated with overshoot and undershoot when the simulated gears are shifted. In one example, the SVSG module 206 module may generate the simulated sound signal 214 to drive the speakers 105 to produce the appropriate sound for overshoot or undershoot for a predetermined period of time.

The SVSG module 206 may allow adjustment of various parameters used to produce the simulated sounds signal 214. For example, the SVSG module 206 may provide an interface through the GUI 112 to receive input for adjustment of the gear ratios. Each virtual gear may be adjusted so that a particular ratio may be input. The SVSG module 206 may also allow adjustment of the minimum and maximum pseudo-engine speed through the GUI 112. The SVSG module 206 may also allow the upshift and downshift threshold points for each simulated gear to be adjusted to desired road speeds through the GUI 112. The SVSG module 206 may allow input to be received for adjustment of a time interval over which the demanded speed is reached for each simulated gear through the GUI 112. This may include an acceleration ramp and deceleration ramp for each simulated gear. The SVSG module 206 may generate the simulated sound signal 214 used to produce sounds associated with the acceleration over the acceleration ramp and deceleration over the deceleration ramp during the selected time intervals, respectively.

Figure 4:
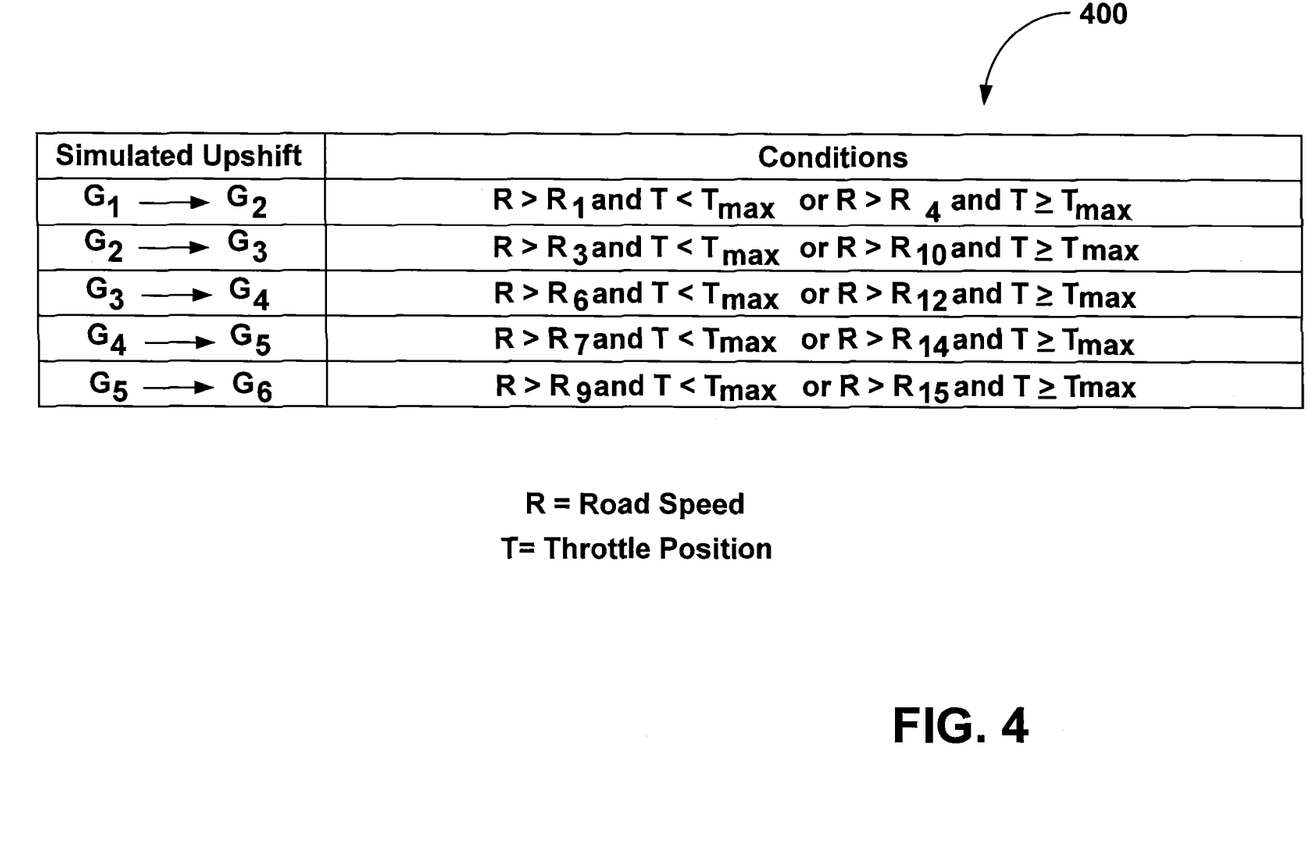
FIG. 4 depicts an example simulated upshift table.
Figure 5:
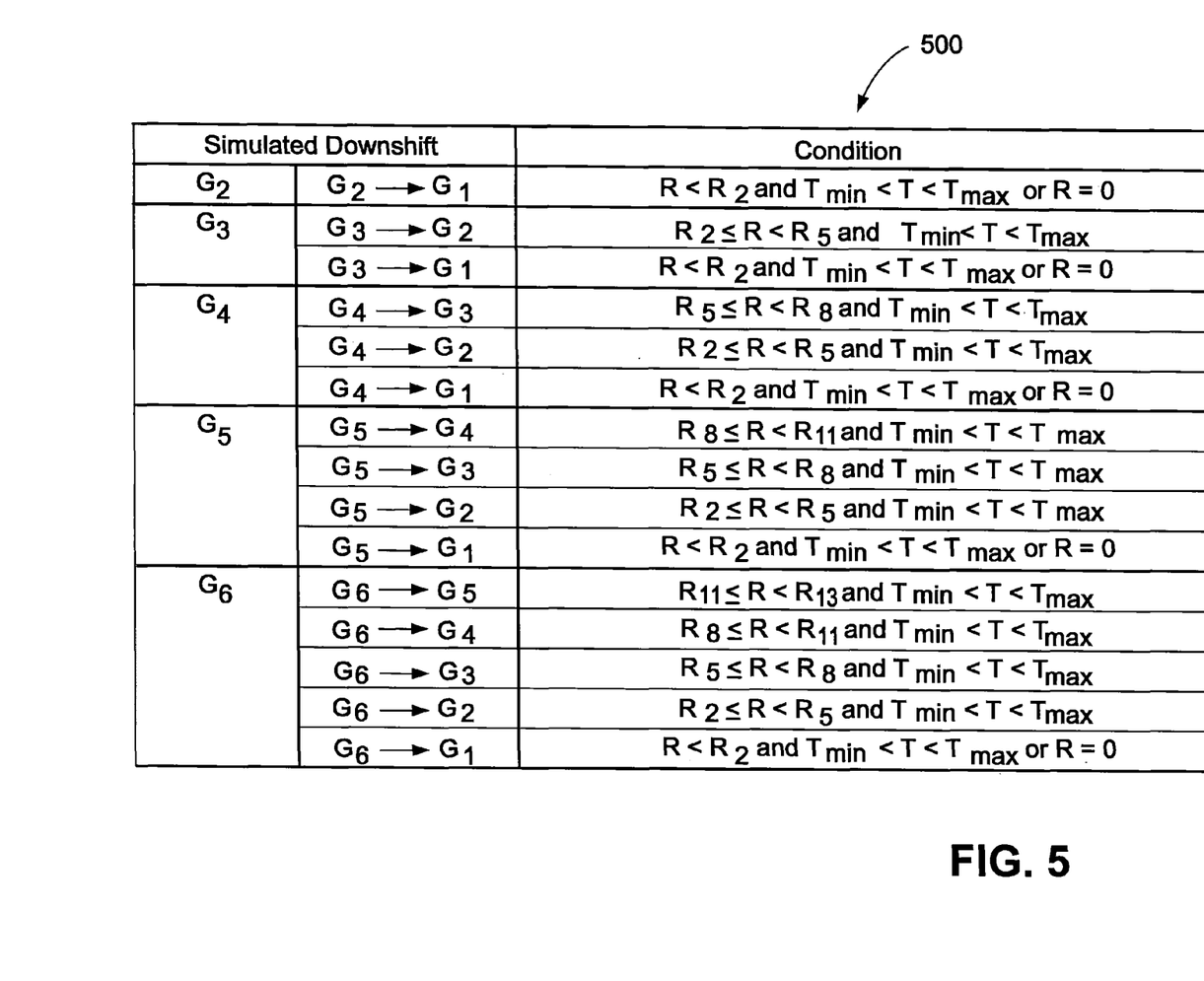
FIG. 5 depicts an example simulated downshift table.

FIG. 4 is an example of a simulated upshift table 400 and FIG. 5 is an example of a simulated downshift table 500 that may each be included in the shift table data set 218 stored in the memory 202. The simulated upshift table 400 shows the upshifting for simulated gears G1 through G5. The simulated vehicle sound generator module 206 may generate simulated sound signal 214 associated with a particular simulated gear G1 through G6 and associated with the upshift of into each simulated gear. The simulated vehicle sound generator module 206 may be configured to generate a simulated sound signal 214 representing an upshift to produce a sound by driving a speaker 105 to produce sounds waves associated with simulated operation in the next highest gear based on the simulated upshift table 400. In one example, each simulated gear other than the highest simulated gear G6, may include a first upshift threshold point and a second upshift threshold point. For example, in the simulated upshift table 400, the sounds associated with the first simulated gear G1 will be produced until the road speed is greater than $R_1$ and the throttle position is less than $T_{max}$. If these conditions exist, sounds associated with an upshift into the second simulated gear G2 will be generated to produce simulated engine sounds associated with operating in the second simulated gear G1. This range of throttle position and road speed may be selected to allow the simulated upshifting to occur during operation of the vehicle 100 that may occur under similar road speeds and engine speeds associated with an internal combustion engine or other engine type.

If the throttle 108 is quickly depressed and is greater than $T_{max}$ before the road speed reaches $R_2$, the simulated upshifting to G2 may be bypassed until the road speed reaches $R_4$. This configuration allows the audio experience associated with simulated upshifting from the first simulated gear G1 to the second simulated gear G2 to also occur when the road speed is greater than $R_4$ and the throttle position is greater than or equal to $T_{max}$. Simulated upshifting at this range of road speeds and throttle position may provide the simulated audio experience associated with sounds generated from quickly pressing down on the accelerator of a vehicle having a combustion engine, which may drive up the engine speed without immediately shifting into the next gear. The simulated upshift table 400 includes similar simulated upshifting conditions for the other simulated gears G2 through G5.

The simulated downshifting table 500 may also be accessed by the simulated vehicle sound generator module 206 during operation of the vehicle 100. The simulated downshifting table 500 may be including in the shifting table data set 218. The simulated downshifting may occur from each current simulated gear to any other lower simulated gear depending on the road speed of the vehicle 100 and the throttle position of the throttle 130. The simulated downshifting table 500 may include simulated downshifting conditions from each gear G2 to G6 to each relative lower gear. For example, the sixth simulated gear G6 may downshift to each of the gears G5 to G1. Downshifting from the sixth gear to any of the other gears may depend on the road speed R and the throttle position T. The simulated downshifting table 500 includes similar operating condition resulting in simulated downshifting for each of the other simulated gears G2 through G5.

While the road speed is greater than zero, no simulated downshifting may occur while the throttle position is less than $T_{min}$. This may produce the experience associated with a vehicle that is coasting with no accelerator input, which will fail to downshift even with a decreasing road speed until the accelerator is reapplied to some degree. The downshifting threshold points are selected to be different from the upshifting threshold points to avoid toggling between simulated gears if the vehicle operates about a particular road speed for a substantial amount of time causing shared threshold points to result in frequent toggling between simulated gears.

In an alternative example, the SVSG module 206 may utilize a set of equations to generate the simulated sounds signal 214. The equations may be stored in the memory 202 and implemented by the SVSG module 206. In such a configuration, the SVSG module 206 may periodically update variables in the set of equations based on various current operating conditions of the vehicle 100 as input, such as road speed and throttle position. The SVSG module 206 may control the simulate sounds signal 214 based on the updated values of the set of equations. Particular equations may be dedicated to determining upshift and downshift threshold points, such that particular values of these equations may indicate when the SVSG module 206 should manipulate the simulated sound signal 214 to simulate upshiftng and downshifting sounds. Particular equations may also be dedicated to indicating that simulated overshoot or undershoot conditions may be present allowing the SVSG module 206 to manipulate the simulated sound signal 214 accordingly.

Figure 6:
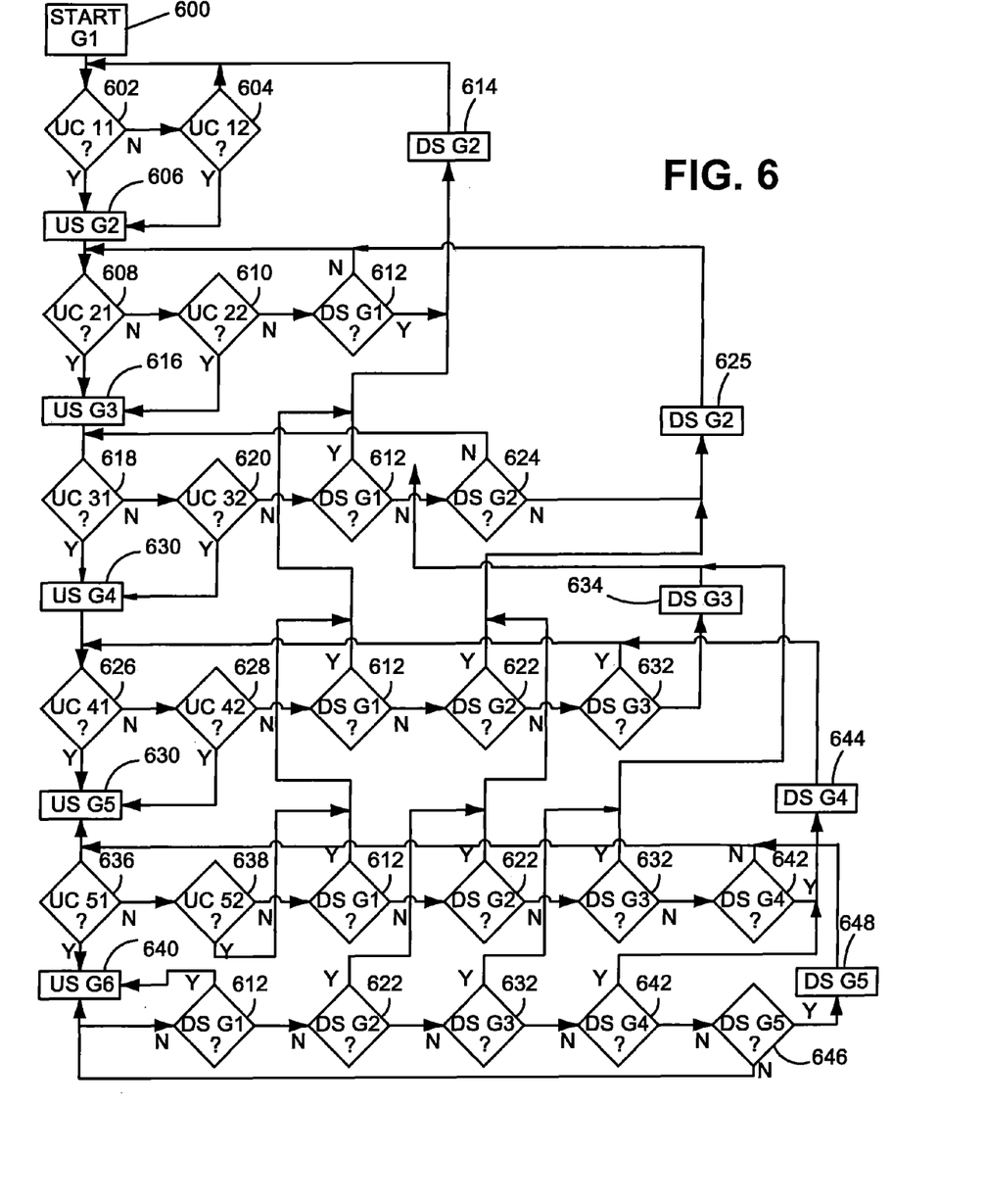
FIG. 6 depicts an example operational flow diagram for the simulated vehicle sound generator system of FIG. 2.

FIG. 6 is an operational flow diagram for generating sounds using the simulated vehicle sound generator module 206 for a six-speed simulated engine. At block 600, the simulated vehicle sound generator module 206 may begin to generate simulated sound signal 214 associated with the first simulated gear G1. At block 602, the SVSG module 206 may determine if a first upshift condition (UC11) for simulated gear G1 is present. For example, as discussed with regard to FIGS. 3-5, one upshift condition may be a road speed of the vehicle 100 above a first road speed threshold point, such as road speed $R_1$, and the throttle position being between $T_{min}$ and $T_{max}$. If such a condition is present, the simulated vehicle sound generator module 206 may generate sounds associated with an upshift to the second simulated gear G2. If the first upshift conditions are not present, at block 604, the simulated sound generator module 206 may determine if a second upshift condition (UC12) is present. In one example, the second upshift condition may be a road speed greater than $R_4$ and a throttle position greater than $T_{max}$. If these conditions are present, the simulated vehicle sound generator module 206 may generate simulated sound signal 214 associated with shifting into and operating in the second simulated gear G2.

While operating in the second simulated gear G2, at block 608 the simulated vehicle sound generator module 206 may determine if a first upshift condition (UC21) is present for G2, such as the road speed being greater than $R_3$ and the throttle position being less than $T_{max}$. If the first upshift condition is present, the simulated vehicle sound generator module 206 may generate sounds associated with shifting into and operation of the third simulated gear G3. If the first upshift condition is not present, the simulated sound generator module may determine the second upshift (UC23) condition is present, such as the road speed being greater than $R_{10}$ and the throttle position being greater than or equal to $T_{max}$. If the second upshift condition is present, the simulated vehicle generator module 206 may generate sounds associated with upshifting to and operation of the third simulated gear G3.

If neither of the upshift conditions of the second simulated gear G2 is present, at block 612, the simulated vehicle generator module 206 may determine if a downshift condition (DS G1) is present to downshift to the first simulated gear G1. In one example, the simulated sound generator module 206 may determine if the road speed is less than $R_2$ and the throttle is between $T_{min}$ and $T_{max}$. If the throttle position is less than or equal to $T_{min}$, the vehicle 100 may be in a "coast" condition representing a relatively small amount of throttle being applied. If the coast condition is present, the simulated vehicle sound generator module 206 may not generate sounds associated with downshifting into the first simulated gear G1. If the downshift condition is present at block 612, at block 614 the simulated vehicle sound generator module 206 may generate sounds associated with downshifting into the first simulated gear G1, and the simulated sound generator module 206 may continue to generate sounds associated with operating in the first simulated gear G1, while continuing to monitor for the presence of the upshift conditions UC11 and UC12.

While operating in the third simulated gear G3, at block 618 the simulated vehicle sound generator module 206 may determine if a first upshift condition (UC31) is present for G3, such as the road speed being greater than $R_6$ and the throttle position being less than $T_{max}$. If the first upshift condition is present, at block 622 the simulated vehicle sound generator module 206 may generate simulated sound signal associated with shifting into and subsequently operation of the fourth simulated gear G4. If the first upshift condition is not present, at block 620 the simulated vehicle sound generator module 206 may determine if a second upshift condition (UC32) is present, such as the road speed being greater than $R_{12}$ and the throttle position being greater than or equal to $T_{max}$. If the second upshift condition is present, at block 622 the simulated vehicle sound generator module 206 may generate sounds associated with upshifting to and subsequent operation in the fourth simulated gear G4.

If none of the upshift conditions are present for the third simulated gear G3, the simulated vehicle sound generator module 206 may determine if downshift conditions are present. The simulated downshift conditions may be based on the road speed of the vehicle 100 and the current road speed of the vehicle 100 may determine the particular simulated gear sounds to generate through the simulated vehicle sound generator module 206. At block 612, the determination for downshifting may be made by the simulated vehicle sound generator module 206 in manner previously discussed. If the conditions for downshifting to the first simulated gear G1 are present, the simulated vehicle sound generator module 206 may produce simulated sound signal 214 associated with the downshift into and operation of the first simulated gear G1. However, the road speed may be higher than the simulated downshift threshold speed for the vehicle 100, but may be appropriate for downshifting to the second simulated gear G2. At block 624, the determination is made by the simulated vehicle sound generator module 206 if downshifting conditions (DS G2) to the second simulated gear G2 are appropriate. In one example, these conditions may be a road speed of great than or equal to $R_2$ and less than $R_5$ and a throttle position between $T_{min}$ and $T_{max}$. If the simulated downshift conditions are present, at block 625 the simulated vehicle sound generator module 206 may adjust the sounds being produced to those of shifting to the second simulated gear G2 and return to producing simulated sounds signals 214 representative of operation in the second simulated gear G2.

While operating in the fourth simulated gear G4, at block 626 the simulated vehicle sound generator module 206 may determine if a first upshift condition (UC41) is present for G4, such as the road speed being greater than or equal to $R_7$ and the throttle position less than $T_{max}$. If the first upshift condition is present, at block 630, the simulated vehicle sound generator module 206 may generate simulated sound signal associated with shifting into and operation of the fifth simulated gear G5. If the first upshift condition is not present, at block 628 the simulated vehicle sound generator module 206 may determine if a second upshift condition (UC32) is present, such as the road speed being greater than $R_{14}$ and the throttle position being greater than or equal to $T_{max}$. If the second upshift condition is present, at block 630 the simulated sound generator module may generate simulated sound signal 214 associated with upshifting to and operation of the fifth simulated gear G5.

If the simulated upshift conditions for the fourth simulated gear G4 are not present, the simulated vehicle sound generator module 206 may determine if simulated downshift conditions are present. The simulated vehicle sound generator module 206 may determine if conditions for downshifting to the first simulated gear G1 and second simulated gear G2 are present at blocks 612 and 622, respectively. If presence of one of the conditions is detected, the appropriate simulated sound signal 214 may be generated for downshifting into the particular simulated gear may be produced by simulated vehicle sound generator module 206. If the conditions are not present, at block 632 the simulated vehicle sound generator module 206 may determine if simulated downshifting conditions (DS G3) to the third simulated gear G3 exist. In one example, the conditions may be the road speed being greater than or equal $R_5$ and less than $R_8$ and the throttle level being between $T_{min}$ and $T_{max}$. If the conditions are present, at block 634, the simulated vehicle sound generator module 206 may generate sounds associated with downshifting to the third simulated gear G3. If the conditions are not present, the simulated vehicle sound generator module 206 may continue producing sounds associated with the third simulated gear G3.

While producing sounds associated with operating in the fifth simulated gear G5, at block 636 the simulated vehicle sound generator module 206 may determine if a first upshift condition (UC51) is present for G5, such as the road speed being greater than or equal to $R_9$ and the throttle position being less than $T_{max}$. If the first upshift condition is present, at block 640 the simulated vehicle sound generator module 206 may generate simulated sound signal 214 associated with shifting into and operation of the sixth simulated gear G6. If the first upshift condition is not present, at block 638 the simulated sound generator module 206 may determine if a second upshift condition (UC52) is present, such as the road speed being greater than $R_{15}$ and the throttle position being greater than $T_{max}$. If the second upshift condition is present, at block 640 the simulated vehicle sound generator module 206 may generate simulated sound signal 214 associated with simulated upshifting to operation of the sixth simulated gear G6.

The simulated vehicle sound generator module 206 may also determine if simulated downshifting may occur while producing sounds associated with operating in the fifth simulated gear G5. In one example, the simulated vehicle sound generator module 206 may determine if sounds associated with downshifting to the first, second, and third simulated gears should occur similar to that previously described. In none of the conditions are present, at block 642 the simulated vehicle sound generator module 206 may determine if downshifting conditions (DS G4) are present for downshifting to the fourth simulated gear G4. In one example, these conditions may be a road speed greater than or equal to $R_8$ and less than $R_{11}$ and the throttle position between $T_{min}$ and $T_{max}$. If the conditions are present, at block 644 the simulated vehicle sound generator module 206 may generate simulated sound signal 214 associated with downshifting into the fourth simulated gear G4 and may continue generating simulated sound signal 214 associated with operating the fourth simulated gear G4. If the downshifting conditions are not present, the simulated vehicle sound generator module 206 may continue generating simulated sound signal 214 associated with operating in the fifth simulated gear G5.

While producing sounds associated with operating in the sixth simulated gear G6, the simulated vehicle sound generator module 206 may determine if downshifting to the lower simulated gears is appropriate. The simulated vehicle sound generator module 206 may determine if simulated downshifting is appropriate for each of the simulated gears G1 through G4 as previously described. If the conditions for downshifting into these gears do not exist, at block 646 the simulated vehicle sound generator module 206 may determine if conditions (DS G5) exist for downshifting into the fifth simulated gear G5. In one example, these conditions may be a road speed less than or equal to $R_{11}$ and greater than $R_{13}$ a throttle position between $T_{min}$ and $T_{max}$. If the conditions are present, the simulated vehicle sound generator module 206 may generate sounds associated with simulated downshifting into the fifth simulated gear G5 and continue producing sounds associated with operating in the fifth simulated gear G5. If the conditions are not present, the simulated vehicle sound generator module 206 may continue generating simulated sound signal 214 associated with operating in the sixth simulated gear G6.

The operational flow diagram of FIG. 6 may be configured to include additional or fewer gears than that described. Furthermore, the particular simulated upshift and downshift conditions may be altered, removed, or replaced for particular implementations of simulated vehicle sound generator module 206. The particular upshift and downshift thresholds may be user-adjusted through input received by through the GUI 112. In one example, the SVSG system 102 may include various options such as simulated vehicle selection, which may modify the gear rations $G_n$ used to determine the rate to increase or decrease simulated sounds intensity regarding the road speed of the vehicle 100. Other input parameters may include simulated manual or automatic transmission. Adjustment of such features may alter the simulated sound signal 214 for each simulated gear allowing a vehicle occupant to achieve a desired sound experience associated with the SVSG system 102.

Figure 7:
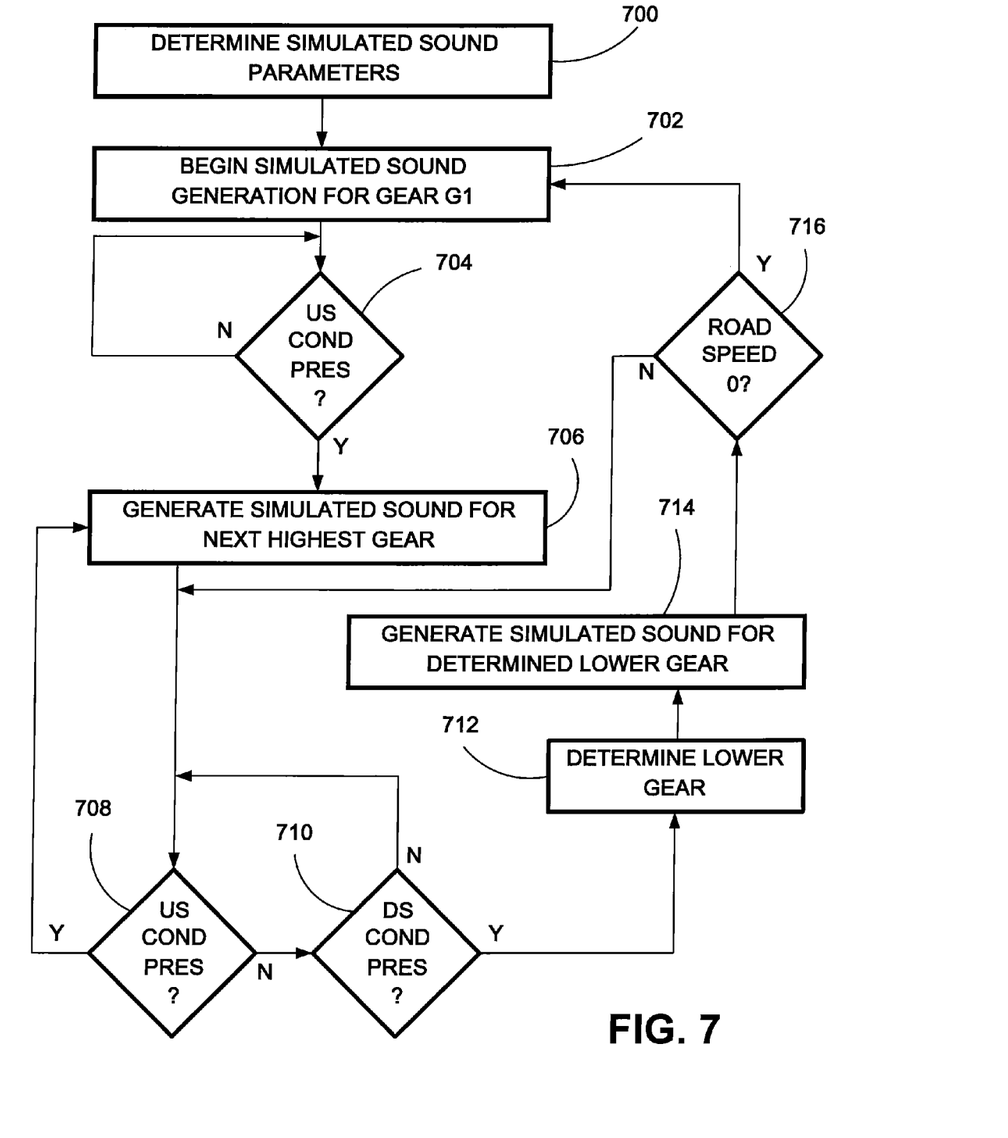
FIG. 7 is another example operational flow diagram for the simulated vehicle sound generation system of FIG. 2.

FIG. 7 is another operational flow diagram for generating simulated multi-gear vehicle sounds using the SVSG system 102. At block 700, the simulated sound parameters may be determined. In one example, the simulated sound parameters may include various vehicles characteristics included in the sound library data set 216. A user may select a particular vehicle type with particular characteristics through the GUI 112. The selected parameters may be received by the simulated vehicle sound generation module 206 in order to determine the appropriate simulated sounds signals 214 to generate.

At block 702, generation of the simulated vehicle sounds may begin in the lowest simulated gear G1. During operation, various operating conditions associated the vehicle 100 may be monitored such as road speed and throttle position. At block 704, the simulated vehicle sound generation module 206 may determine if an upshift condition is present. Various upshift conditions may be used, such as those described with regard to the simulated upshift table 400. If no upshift condition is present, the simulated vehicle sound generation module 206 may continue generation simulated sound signal 214 associated with the first simulated gear G1. If the upshift condition is present, at block 706 the simulated vehicle sound generation module 206 may generate simulated sound signal 214 associated with the next highest gear, G2. During generation of the simulated sounds signals 214 for the second simulated gear G2, at block 708 the simulated vehicle sound generation module 206 may determine if another upshift condition is present. If another upshift condition is present, at block 706 the simulated vehicle sound generation module 206 may begin generating simulated sound signal associated with the next highest gear.

If the upshift condition is not present at block 708, at block 710 simulated vehicle sound generation module 206 may determine if a downshift condition is present. The downshift conditions may be predetermined such those discussed with regard to the simulated downshift table 500, for example. If downshift conditions are not present, the simulated vehicle sound generation module 206 may continue generating simulated sounds signals 214 for the current simulated gear. If the downshift conditions are present, at block 712 simulated vehicle sound generation module 206 may determine the appropriate gear to which to downshift based on conditions such as those in the simulated downshift table 500. Upon determination of the appropriate simulated gear, at block 714 the simulated vehicle sound generation module 206 may generate simulated sound signal 214 associated with the determined lower gear.

At block 716, simulated vehicle sound generation module 206 may determine if the vehicle 100 has stopped resulting in a road speed of zero. If the vehicle has stopped, the simulated vehicle sound generation module 206 may begin generation of the simulated sounds signals 214 for the first simulated gear G1. If the road speed is not zero, simulated vehicle sound generation module 206 may continue generating simulated sound signal for the current simulated gear selected. The operational flow diagram of FIG. 7 may continue to operate until the SVSG system 102 is deactivated by a vehicle occupant or the vehicle is power off.

The operational flow diagram of FIG. 7 may be used in conjunction with the operation flow diagram of FIG. 6. In one example, the six simulated gears of the operation flow diagram of FIG. 6 may be configured to be a subset of the operational flow diagram of FIG. 7.

Figure 8:
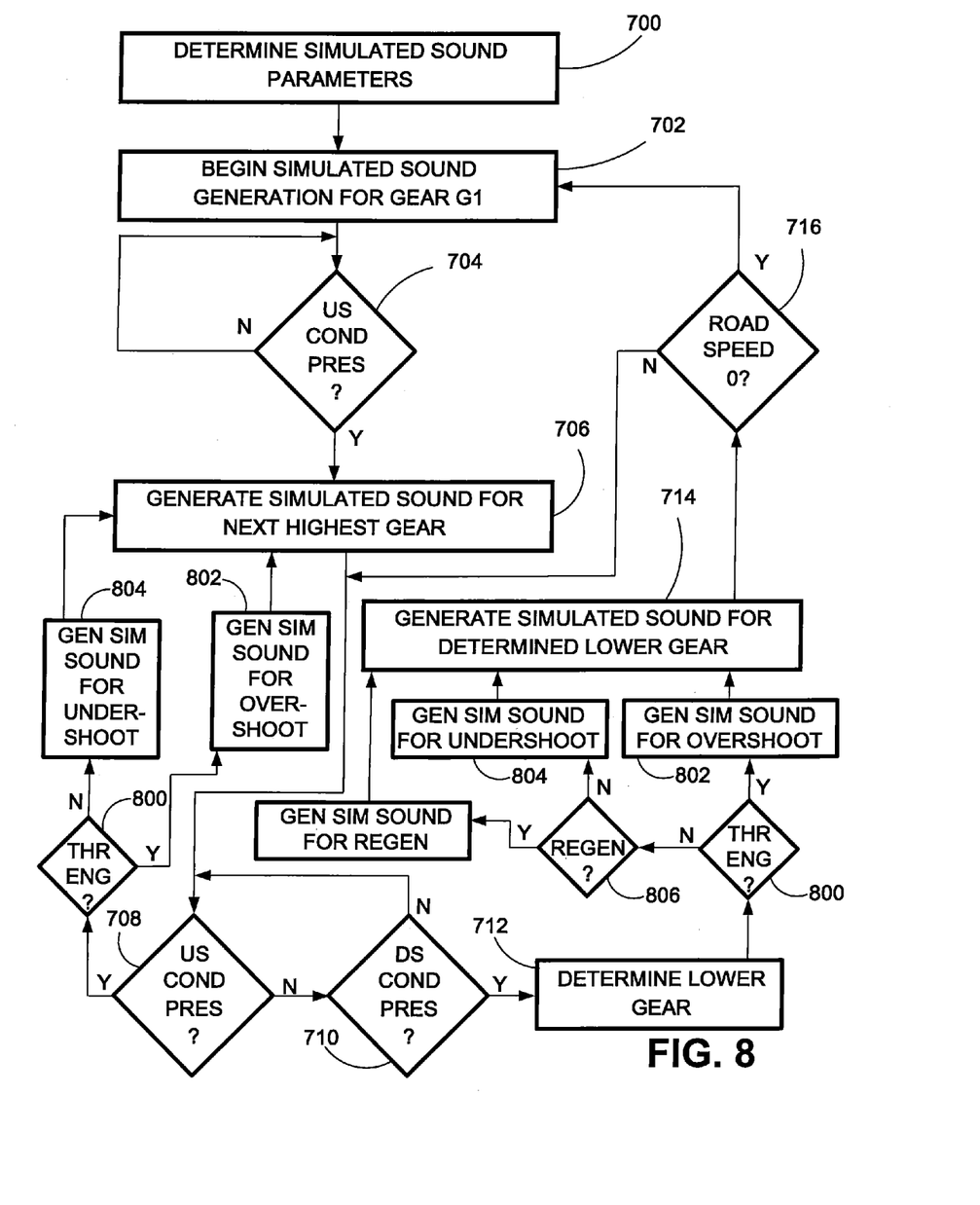
FIG. 8 is another example operational flow diagram for the simulated vehicle sound generation system of FIG. 2.

FIG. 8 is another operational flow diagram operational flow diagram for generating simulated multi-gear vehicle sounds using the SVSG system 102. The operational flow diagram of FIG. 8 is similar to that of FIG. 7. In FIG. 8, if an upshift condition is present (block 708) a determination (block 800) may be made regarding throttle engagement. If the throttle 108 of the vehicle 100 is engaged, sound associated with engine overshoot may be generated (block 802) prior to the simulated sound for the next highest gear being generated (block 706). If the throttle 108 is not engaged, sounds associated with engine undershoot may be generated (block 804) prior to the simulated sound for the next highest gear being generated (block 706).

If a downshift condition is determined to be present and a lower gear is determined (block 712), a determination may be made regarding the throttle engagement (block 800). If the throttle is engaged, sound associated with engine overshoot may be generated (block 802) prior to the simulated sound for the determined lower gear (block 712). If the throttle 108 is not engaged, a determination may be made regarding if motor regeneration is present (block 806). If motor regeneration is present, simulated sounds associated with engine braking may be generated (block 808) prior to simulated sounds for the determined lower gear being generated (block 714). If regeneration is not present, simulated sounds associated with engine braking may be generated (block 810) prior to simulated sounds for the determined lower gear being generated (block 714).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A simulated vehicle sound generator system for a vehicle, the system comprising:
   a memory configured to store sound information for an engine;
   a processor in communication with the memory; and
   a simulated vehicle sound generation module executable by the processor to:
      receive a signal indicative of an operating condition of the vehicle, where the operating condition relates to an engine type, a road speed of the vehicle and a throttle position;
      select a first simulated gear in response to the operating condition of the vehicle;
      generate a sound signal based on sound information retrieved from the memory, the sound signal configured to drive at least one sound generation device to produce variable sound waves to simulate operation of the engine in the first simulated gear;
      determine a shift condition between simulated gears in response to the operating condition indicative of the road speed of the vehicle reaching a variable threshold point corresponding to the first simulated gear, the variable threshold point being variable based on the operating condition indicative of the throttle position of the vehicle;
      select a second simulated gear in response to the determined shift condition; and
      adjust the sound signal in response to the determined shift condition, the sound signal being adjusted to drive the at least one sound generation device to produce variable sound waves to simulate operation of the engine in the shift condition and in the second simulated gear.

2. The simulated vehicle sound generator system of claim 1, where the engine is an electric motor, and the simulated vehicle sound generation module is further executable by the processor to monitor a differential of a signal representative of the speed of the vehicle and a load of the electric motor to generate the sound signal.

3. The simulated vehicle sound generator system of claim 1, where the simulated vehicle sound generation module is further executable by the processor to determine the shift condition in response to the operating condition indicative of the road speed of the vehicle exceeding the variable threshold point corresponding to the first simulated gear at a current value of the operating condition indicative of the throttle position of the vehicle, where the second simulated gear is higher than the first simulated gear, and the shift condition is an upshift condition.

4. The simulated vehicle sound generator system of claim 1, where the simulated vehicle sound generation module is further executable to determine the shift condition when the operating condition indicative of the road speed of the vehicle is within a predetermined vehicle speed range and the operating condition indicative of the throttle position of the vehicle is within a throttle position range, the shift condition being a downshift condition, where the second simulated gear is lower than the first simulated gear.

5. The simulated vehicle sound generator system of claim 1, where the variable threshold point determined by the simulated vehicle sound generation module corresponding to the first simulated gear increases with increasing throttle position between a minimum simulated upshift threshold value at a minimum throttle position and a maximum simulated upshift threshold value at a maximum throttle position.

6. The simulated vehicle sound generator system of claim 5, where the simulated vehicle sound generation module is further executable by the processor to bypass determination of the shift condition in response to the operating condition indicative of the road speed of the vehicle being greater than zero and the operating condition indicative of the throttle position of the vehicle being less than the simulated upshift threshold value.

7. The simulated vehicle sound generator system of claim 1, where the at least one sound generation device comprises a first loudspeaker configured to project sound waves directed into a cabin of the vehicle and a second loudspeaker configured to project sound waves outside the cabin.

8. The simulated vehicle sound generator system of claim 1, where the simulated sound generation module is further executable to receive a signal indicative of a user input of an effective gear ratio and to adjust the first operating range of the first simulated gear based on the received signal.

9. The simulated vehicle sound generator system of claim 1, where the vehicle is at least a partially-electric vehicle comprising an electric motor, and where the simulated vehicle sound generation module is further executable by the processor to:
receive a signal indicative of the road speed of the vehicle;
determine an amount of current used by the electric motor for power regeneration of the vehicle;
retrieve sound information corresponding to the road speed of the vehicle and the amount of current used for power regeneration; and
adjust the sound signal based on the retrieved sound information.

10. A method of generating simulated engine sounds in an audio system of a vehicle, the method comprising:
receiving a first current operating condition indicative of a current speed of the vehicle for a selected one of a plurality of engine types and a second current operating condition indicative of a current throttle position of the vehicle with a processor;
selecting, with the processor, a first simulated gear from a plurality of respective simulated gears in response to the received first and second current operating conditions of the vehicle;
driving a sound generation device of the vehicle to produce variable sound waves to simulate variable operation of an engine within a first operating range of the first simulated gear based on the first and second current operating conditions of the vehicle;
mapping a plurality of threshold values to the first operating range of the first simulated gear;
the processor dynamically determining a shift condition based on variations in the first and second current operating conditions of the vehicle and a threshold value in the first operating range of the first simulated gear;
selecting a second simulated gear from the plurality of respective simulated gears in response to the determined shift condition and the first and second current operating conditions of the vehicle; and
driving the at least one sound generation device of the vehicle to produce variable sound waves to simulate variable operation of the engine during the shift condition when transitioning from the first simulated gear to the second simulated gear within the second operating range of the second simulated gear based on the first and second current operating conditions of the vehicle, the first operating range and the second operating range being different.

11. The method of claim 10, further comprising driving the at least one sound generation device of the vehicle to produce variable sound waves to simulate a gear transition between simulation of variable operation of the engine within the first operating range and simulation of variable operation of the engine within the second operating range.

12. The method of claim 10, where the shift condition is a downshift condition and the threshold value is a downshift speed threshold value, where determining the downshift condition comprises determining that the first current operating condition indicative of the current speed of the vehicle is less than the downshift speed threshold value of the first simulated gear which corresponds to the second current operating condition indicative of the current throttle position, and where the second simulated gear is a simulated gear lower than the first simulated gear.

13. The method of claim 10, where the shift condition is an upshift condition and the threshold value is an upshift speed threshold value, where determining the upshift condition comprises determining that the first current operating condition indicative of the current speed of the vehicle is greater than the upshift speed threshold value of the first simulated gear which corresponds to the second current operating condition indicative of the current throttle position, and where the second simulated gear is a simulated gear higher than the first simulated gear.

14. A non-transitory computer-readable storage medium encoded with computer-executable instructions, the computer-executable instructions executable with a processor, the computer-readable storage medium comprising:
instructions to select a first simulated gear of a vehicle based on a first signal indicative of a first current operating condition of the vehicle with a selected engine type from a plurality of engine types and a second signal indicative of a second current operating condition of the vehicle, wherein the first current operating condition is a variable threshold of a road speed of the vehicle and the second current operating condition is indicative of a load of the vehicle;

instructions to drive at least one sound generation device in the vehicle to variably produce a simulated sound of an engine operating in an operating range of the first simulated gear as the first signal indicative of the first current operating condition of the vehicle changes and the second signal indicative of a second current operating condition of the vehicle changes;

instructions to dynamically select a second simulated gear of a vehicle in response to a shift condition identified from variations in the relationship of the variable threshold of the road speed of the vehicle with respect to the second signal indicative of the second current operating condition of the vehicle; and instructions to drive the at least one sound generation device in the vehicle to variably produce a simulated sound of the engine operating in an operating range of the second simulated gear as the first signal indicative of the first current operating condition of the vehicle, the second signal indicative of a second current operating condition of the vehicle changes, and during a transition period between the first simulated gear and the second simulated gear.

15. The computer-readable storage medium of claim 14, further comprising instructions to receive a signal indicative of user input representative of a desired engine type; and instructions to adjust the simulated sound of the engine in accordance with the desired engine type.

16. The computer-readable storage medium of claim 14, further comprising instructions to identify the shift condition based on the first current operating condition comprise instructions to detect a reduction in the road speed of the vehicle to within a predetermined vehicle speed range and to detect that a throttle position is within a predetermined throttle position range, where the second simulated gear is lower than the first simulated gear.

17. The computer-readable storage medium of claim 14, where the instructions to dynamically select a second simulated gear of a vehicle in response to a shift condition comprise instructions to identify the shift condition based on the first signal indicative of the first current operating condition being the road speed of the vehicle which reaches a variable threshold point corresponding to the first simulated gear, the variable threshold point being variable based on the second signal indicative of the second current operating condition indicative of the load of the vehicle.

18. The simulated vehicle sound generator system of claim 1, wherein the simulated vehicle sound generation module is executable by the processor to produce an overshoot sound signal or an undershoot sound signal for a predetermined period of time at the shift condition between the simulated gears.

19. The simulated vehicle sound generator system of claim 1, wherein the simulated vehicle sound generation module executable by the processor is to generate an external sound signal to drive an external speaker to produce sound outside the vehicle.

20. The simulated vehicle sound generator system of claim 19, wherein the simulated vehicle sound generation module executable by the processor is to control a shaker panel to vibrate portions of the vehicle.

* * * * *